United States Patent [19]

Chiba

[11] Patent Number: 4,761,445
[45] Date of Patent: Aug. 2, 1988

[54] POLYAMIDE RESIN COMPOSITION

[75] Inventor: Kazumasa Chiba, Nagoya, Japan

[73] Assignee: Stamicarbon, B.V., Geleen, Netherlands

[21] Appl. No.: 890,776

[22] PCT Filed: Nov. 20, 1985

[86] PCT No.: PCT/NL85/00047

§ 371 Date: Jul. 15, 1986

§ 102(e) Date: Jul. 15, 1986

[87] PCT Pub. No.: WO86/03213

PCT Pub. Date: Jun. 5, 1986

[30] Foreign Application Priority Data

Nov. 21, 1984 [JP] Japan ................. 59-244387

[51] Int. Cl.$^4$ .................... C08K 5/54; C08L 83/06
[52] U.S. Cl. .................. 524/262; 524/261; 524/264; 524/265; 524/266; 524/267; 524/268; 524/538; 524/606; 525/431
[58] Field of Search ............ 524/261, 262, 264, 265, 524/267, 266, 268, 538, 606; 525/431

[56] References Cited

U.S. PATENT DOCUMENTS 4,428,589  1/1984  Reinsmo ................. 277/101

FOREIGN PATENT DOCUMENTS 0021352   9/1969  Japan ................. 524/267
0118453   9/1979  Japan ................. 524/606
0174345  10/1982  Japan ................. 524/606
0142247   8/1984  Japan ................. 524/268
0038439   2/1985  Japan ................. 524/261
1028694   7/1983  U.S.S.R. ............. 524/265

OTHER PUBLICATIONS

Chemical Abstracts, vol. 80, No. 23, 3 Jun. 1974, Kashio Junzo et al., "Polyamide Powdery Composition for Coating", p. 98, abs. no. 122569q & JP, A, 7328337 (Toray Industries), Aug. 31, 1973.

Chemical Abstracts, vol. 80, No. 10, 11 Mar. 1974, Ohba Tasaaki, "Holding by Polymerization of Lactams", pp. 30, 31, abs. no. 48814x & JP, A, 7251479 (Teijin), Dec. 31, 1972.

Primary Examiner—John C. Bleutge
Assistant Examiner—David W. Woodward
Attorney, Agent, or Firm—Cushman, Darby & Cushman

[57] ABSTRACT

The subject invention relates to polytetramethylene adipamide resin compositions containing 100 parts by weight of the polyamide and 2 to 20 parts by weight of a silicon oil. Objects produced from the composition possess good surface appearance, excellent sliding properties and high heat resistance and rigidity.

8 Claims, No Drawings

POLYAMIDE RESIN COMPOSITION

DETAILED DESCRIPTION OF THE INVENTION

1. Scope of industrial application

The subject invention relates to polytetramethylene adipamide resin compositions superior in sliding characteristics.

2. Description of prior art

Being fundamentally superior in friction and wear characteristics, polyamides are regarded as being suitable for manufacturing gears and bearings and other sliding parts. The wear depends on the pressures applied to the sliding surface, the sliding speeds, the atmospheric conditions, the temperature and so forth.

For practical applications resistance to increasingly severe conditions are demanded and polyamide materials have been modified for this. Hitherto polyamide compositions obtained by adding molybdenum disulfide, polyethylene, fluoric polymers and silicon oils to polyamides have generally been used for this purpose.

However it has been observed that in the case of the ordinary straight-chain polyamides e.g. polycaprolactam (nylon-6) or polyhexamethylene adipamide (nylon-6.6), the silicon oil is insufficiently accepted by the material and causes considerable bleed-out to the surface of moldings that are obtained from compositions of these polyamides with silicon oils. Because of this bleeding-out effect the moldings become inferior in surface appearance.

However for obtaining good sliding properties it is necessary to have the silicon oil present in appreciable amounts. Further the mechanical properties of the polyamide composition should remain high to be usefull under severe conditions. One has tried to solve this problem in essentially two manners. In the first solution one uses mixtures of lubricants, in which silicon oil is present in low concentrations. For instance a mixture of 2 percent silicon oil and 18 percent by weight polytetrafluoroethylene in 80 percent by weight polyamide is used in U.S. Pat. No. 4,428,589. Secondly one has tried to incorporate in the polyamide molding an inorganic highly porous material which functions as a carrier for the silicon oil. See for instance JP-A-57174345.

However these compositions have the disadvantage of being difficult to process, or need expensive materials or the physical properties of the polyamide composition have been negatively effected.

The object of the invention is therefore to produce a polyamide/silicon oil composition of superior sliding properties and mechanical strength with good surface appearance.

It has been found that polytetramethylene adipamide (nylon-4.6) shows a surprisingly high affinity for silicon oils, so that even at high concentrations of the silicon-oils no unacceptable level of bleeding is observed. Further the resin composition shows superior properties over present materials to make a highly practicable material for various kinds of gears and bearings. Especially the combination of high heat resistance and rigidity of nylon 4.6 and the vast improvement in sliding performance due to the presence of a relatively high concentration of silicon oil produces these synergistic effects.

Therefore the polyamide resin composition according to the subject invention is obtainable by blending 2 to 20 parts by weight of silicon oil with 100 parts by weight of a polyamide with tetramethylene adipamide as main component.

The polyamides according to the subject invention are copolymers and mixtures of polyamides containing polytetramethyleneadipamide and tetramethylene adipamide as main components. In principle there exist no limitations concerning the copolymer and mixture components, so that all known amide-forming compounds can be chosen.

Representative among the former are 6-aminocaproic, 11-aminoundecanic, 12-aminododecanic, paraminomethylbenzoic and other amino acids; ε-caprolactam, ω-laurolactam and other lactams; hexamethylenediamine, undecamethylenediamine, dodecamethylenediamine, 2.2.4-/2,2,4-trimethylhexamethylenediamine, 5-methylnonamethylenediamine, methaxylirenediamine, paraxylirerediamine 1,3- and 1,4-bis(aminomethyl)cyclohexanes, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis-(aminopropyl)piperazine, aminoethylpiperazine and other diamines and adipic acids; and adipic, suberic, azelaic, dodecane-2, terephthalic, isophthalic, 2-chlorotere-phthalic, 2-methylterephthlatic, 5-methylisophthalic, 5-sodiumsulfoisophthalic, hexahydroterephthalic, hexahydroisophthalic, diglycolic and other dicarboxylic acids. The latter include the polyamides being composed thereof.

Polyamides containing tetramethylene as main component, for instance more than 80 mole percent, can be produced by any known process. However preference should be given to the processes disclosed in U.S. Pat. Nos. 4,460,762, 4,408,036 and 4,463,166 or EP-A Nos. 0039524, 0038094 and 0077106.

High molecular weight polyamides should be produced through solidphase after condensation in a water-vapor containing atmosphere of prepolymers having small contents of cyclic endgroups, that are produced under specific conditions or in 2-pyrrolidone, N-methylpyrrolidone or another polar organic solvent. Their degree of polymerization can vary in principle over a wide range. The polymers having a relative viscosity between 2.0 and 6.0 g/dl, as measured in a solution of 1 gram in 100 ml 98% by weight sulphuric acid, are preferred.

The silicon oils according to the subject invention are the polymers fundamentally having polysiloxane structures. Representative thereamong are for example the modified polysiloxanes containing polydimethylsiloxane and dimethylsiloxane, the materials with component units represented by the following formulae (1) to (7) and materials possessing end groups represented by the following formulae (8) to (12).

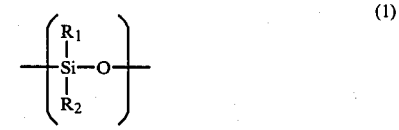

(1)

(2)

-continued (3) 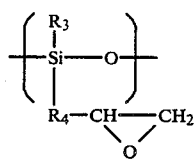

(4) 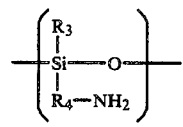

(5) 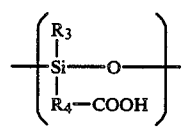

(6) 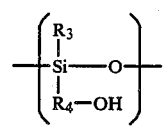

(7) 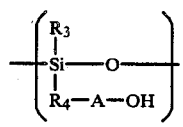

(8) 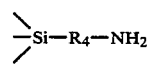

(9) 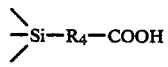

(10) 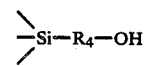

(11) 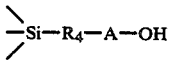

(12) 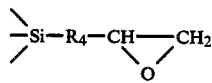

Wherein $R_1$ and $R_2$ denote hydrogen atoms, the alkyl groups having one to four carbon atoms, cyclohexyl groups, phenyl groups and benzyl groups ($R_1$ and $R_2$ not being simultaneously hydrogen or a methyl group); $R_3$ an alkyl group having one to four carbon atoms; $R_4$ an alkylene group having one to six carbon atoms and A an polyalkylene having a polymerization degree of 1 to 50.

The viscosity fo the silicon oils according to the invention is not limitative and can be selected within the range of 100 to 50,000 centistokes at a temperature of 25° C. However those having viscosities of 1,000 to 30,000 centistokes are preferably used for the convenience of the handling in blending and mixing with polyamides.

The resin compositions according to the subject invention are produced by adding 2 to 20, preferably 3 to 18, more preferably 5 to 15, parts by weight of silicon oils to 100 parts by weight of polytetramethylene adipamide. Addition ratios less or more than 2 or 20 parts, respectively by weight do not improve them in sliding characteristic or cause decomposition, foaming and other undesirable phenomena.

Other materials e.g. pigments, dyes, reinforcers, fillers, heat stabilizers, anti-oxidants, weather resistants, nucleating agents, mold release agents, plasticizers, flame retardants, antistatics and other polymers may be added to the resin compositions according to the subject invention unless their moldabilities and physical properties are affected. Particularly the addition of reinforcers and fillers is important. The fibrous and powdery reinforcers available therefor include more specifically glass fibers, asbestos fibers, carbon fibers, graphite fibers, wollastonite, talc, calcium carbonate, mica, clay, potassium titanate whisker and glass beads.

The processes for producing resin compositions according to the subject invention are not limited. One of the most common ones is the melting and mixing of both components supplied to a one- or multi-shaft extruder eventually after premixing in solid form. The resin compositions according to the invention can be used for the production of moldings being superior in physical properties by injection molding, extrusion, blow-molding, compressive and the other molding methods being used for ordinary thermoplastic resins. They are useful for manufacturing various automotive parts, mechanical parts, electric and electronic parts, general miscellaneous goods and so forth.

EMBODIMENTS

The subject invention will be described in more detail in connection with the examples hereinafter. The following methods were used to evaluate the characteristics of the polymers and their moldings in the examples and comparative examples.
(1) Relative viscosity: JIS K6810
(2) Sliding characteristic: the friction coefficient of test pieces with steal (S-45C) and the limit PV product value at which they melt by frictional heat were measured by using a Suzuki type frictional and wear characteristic tester with surface pressure (Pkg/cm$^2$) and running speed (Vm/min.) changed.
(3) Tensile characteristic: ASTM D638
(4) Bending characteristic: ASTM D790
(5) Izod impact strength: ASTM D256
(6) Thermal deformation temperature: ASTM D648

EXAMPLE 1

A mixture prepared by mixing 10 parts by weight of polydimethylsiloxane (Toray Silicon K.K.'s SH 200 showing a viscosity of 12,500 cs at a temperature of 25° C.) to 100 parts by weight of nylon-46 powder having a relative viscosity of 3.90 was melted, kneaded and pelletized at a temperature of 305° C. using a 40 mm aperture molder. These pellets were vacuum-dried and used for the molding of various kinds of test pieces for measuring the different physical properties by using an injector molder with its cylinder and mold set at the temperatures of 300° C. and 80° C. respectively. Table 1 shows the results of the evaluation of the sliding characteristics and other physical properties.

Causing only a little surface bleed-out of silicon oil, the molding showed to be very superior in sliding characteristics, strength, rigidity and heat resistance. The molding stability of the materials and the physical properties and appearances of the test pieces were measured as shown in the table.

COMPARATIVE EXAMPLE 1

Test pieces obtained through the injection molding of nylon 4,6 without silicon oil as was used for Example 1 showed the following unsatisfactory values of the sliding characteristics.
Wear coefficient: 0.65
Limit PV product value: 600 kg/cm$^2$.m/min.

COMPARATIVE EXAMPLE 2

Experiment 1 was repeated, however 30 parts of polydimethylsiloxane had been added. Considerable foam formation happened, indicating a very low operational stability.

COMPARATIVE EXAMPLE 3

The test pieces obtained through the same extruder kneading and injection molding as being mentioned in connection with Experiment 1 except that nylon 4,6 is replaced with nylon 6,6 showed an inferior appearance caused by considerable surface bleed-out of silicon oil.

EXPERIMENTS 2 to 14

Table 1 shows the physical properties of the test pieces obtained through the same operation as described in Experiment 1 with the different kinds and addition ratios of nylon 4,6 and silicon oil. In all cases shown in the table 1, polyamide resin compositions superior in sliding characteristic, strength, ridigity and heat resistance were obtained.

EMBODIMENT 15

A mixture obtained by adding 12 parts by weight of the polydimethylsiloxane from Example 1 and 45 parts by weight of a chopped strand glass fiber (Nippon Denki Glass ECS03) to 100 parts by weight of nylon 4,6 pellets having a relative viscosity of 3.70 was melted, kneaded and pelletized at a temperature of 310° C. using a 65 mm aperture molder. The following were the physical properties obtained after vacuum-drying and injection-molding of these pellets.
Tensile strength: 1,830 kg/cm$^2$
Bending strength: 2,750 kg/cm$^2$
Bending: 96,000 kg/cm$^2$
Izod impact strength: 9 kg.cm/cm-notch
Thermal deformation temperature: 285° C.
Limit PV product: 3,500 kg/cm$^2$.m/min.

TABLE 1

| Embodiment | 1 | 2 | 3 | 4 | 5 | 6 | 7 |
|---|---|---|---|---|---|---|---|
| Polyamide[a] | N-46 | N-46 | N-46 | N-46 | N-46 | N-46 | N-46 |
| (Relative viscosity) | (3.90) | (3.60) | (3.90) | (3.80) | (3.90) | (3.50) | (3.80) |
| Silicone oil[b] | SH200 | SH710 | SH1107 | SH410 | SF8417 | SF8418 | SF8427 |
| (Amount) (parts by wt.) | (10) | (12) | (7) | (5) | (10) | (10) | (10) |
| Friction coefficient | 0.08 | 0.06 | 0.11 | 0.12 | 0.08 | 0.07 | 0.06 |
| Limit PV (kg/cm$^2$.m/min.) | 2,000 | 2,200 | 1,800 | 1,700 | 2,100 | 2,200 | 2,500 |
| Tensile strength at yield (kg/cm$^2$) | 920 | 900 | 950 | 900 | 940 | 980 | 920 |
| Elongation at break (%) | 16 | 20 | 22 | 20 | 18 | 25 | 20 |
| Flexural strength (kg/cm$^2$) | 1,010 | 1,000 | 1,050 | 1,010 | 1,020 | 1,100 | 1,100 |
| Flexural modulus (kg/cm$^2$) | 29,200 | 29,000 | 29,300 | 29,000 | 29,200 | 29,300 | 29,000 |
| Izod impact strength (kg.cm/cm notch) | 7 | 7 | 7 | 7 | 6 | 6 | 7 |
| Heat distortion temperature (°C.) (Load 18.6 kg/cm$^2$) | 170 | 172 | 170 | 170 | 171 | 171 | 170 |
| Surface appearance of molded articles | Excellent | Excellent | Excellent | Excellent | Excellent | Excellent | Excellent |

| Embodiment | 8 | 9 | 10 | 11 | 12 | 13 | 14 |
|---|---|---|---|---|---|---|---|
| Polyamide[a] | N-46 | N-46 | N-46 | N-46 | N-46/6: 95/5 | N-46/66: 90/10 | N-46//N-66: 90//10 |
| (Relative viscosity) | (3.80) | (3.90) | (5.80) | (3.10) | (4.70) | (3.50) | (3.40) |
| Silicone[b] | SF8428 | SF8421 | SH200 | SH200 | SH200 | SH200 | SH200 |
| (Amount) (parts by wt.) | (10) | (11) | (12) | (5) | (10) | (8) | (10) |
| Friction coefficient | 0.08 | 0.08 | 0.05 | 0.12 | 0.15 | 0.12 | 0.06 |
| Limit PV (kg/cm$^2$.m/min.) | 1,900 | 2,000 | 2,600 | 1,500 | 1,200 | 1,200 | 1,300 |
| Tensile strength at yield (kg/cm$^2$) | 950 | 920 | 900 | 1,020 | 890 | 880 | 900 |
| Elongation at break (%) | 20 | 15 | 15 | 30 | 32 | 29 | 20 |
| Flexural strength (kg/cm$^2$) | 1,010 | 1,000 | 1,050 | 1,100 | 990 | 990 | 1,010 |
| Flexural modulus (kg/cm$^2$) | 29,200 | 29,300 | 29,500 | 30,000 | 28,800 | 28,700 | 29,000 |
| Izod impact strength (kg.cm/cm notch) | 7 | 7 | 8 | 7 | 8 | 8 | 7 |
| Heat distortion temperature (°C.) (Load 18.6 kg/cm$^2$) | 170 | 172 | 170 | 170 | 165 | 166 | 165 |
| Surface appearance of molded articles | Excellent | Excellent | Excellent | Excellent | Excellent | Excellent | Excellent |

[a]N—4,6-polytetramethylene adipamide, N—4,6/6-poly/tetramethylene adipamide/caprolactam) copolymer (copolymerization ratio: 95/5 percents), N—4,6/6,6-poly(tetramethylene adipamide/hexamethylene adipamide) copolymer (copolymerization 90/10 percents by weight), N—4,6/N—6,6: polytetramethylene adipamide and polyhexamethylene adipamide (mixing ratio 90/10 percents by weight)
[b]All the following are the grade names given by Toray Silicon K.K.

TABLE 1-continued

SH 710 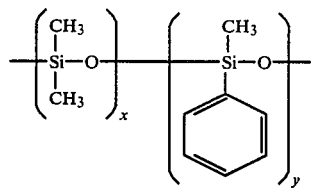

SH 1107 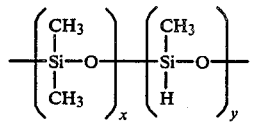

SH 410 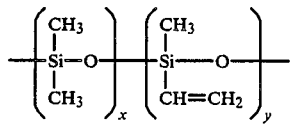

SF 8417 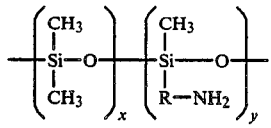

SF 8418 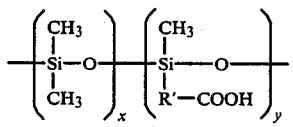

SF 8427 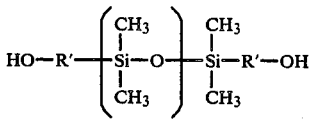

SH 8428 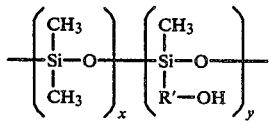

SH 8421 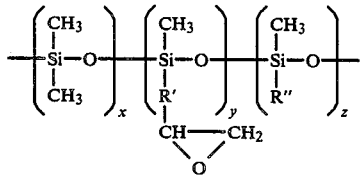

I claim:

1. A polyamide resin composition comprising 100 parts by weight of a polyamide having tetramethylene adipamide as a main component and 2 to 20 parts by weight of a silicon oil.

2. The polyamide resin composition according to claim 1 wherein said polyamide resin composition comprises 3 to 18 parts by weight of said silicon oil.

3. The polyamide resin composition according to claim 1 wherein said polyamide resin composition comprises 5 to 15 parts by weight of said silicon oil.

4. The polyamide resin composition according to claim 1 wherein said silicon oil has a viscosity in the range of 100 to 50,000 centistokes.

5. The polyamide resin composition according to claim 4 wherein said silicon oil has a viscosity in the range of 1,000 to 30,000 centistokes.

6. A mold consisting essentially of a polyamide resin composition according to claim 7. A process for the preparation of a polyamide resin composition having superior sliding characteristics comprising blending 2 to 20 parts by weight of silicon oil with 100 parts by weight of a polyamide having tetramethylene adipamide as a main component.

8. The polyamide resin composition according to claim 1 wherein said silicon oil is selected from the group consisting of polysiloxanes having component units selected from the group consisting of the following formulas 1 to 7 and polysiloxanes having end groups selected from the group consisting of the following formulas 8 to 12:

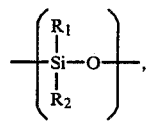 (1)

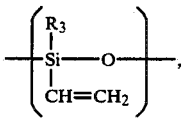 (2)

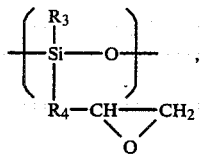 (3)

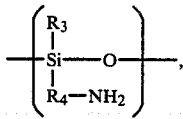 (4)

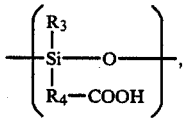 (5)

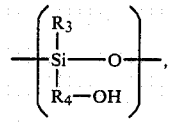 (6)

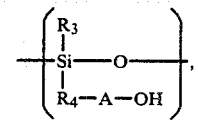 (7)

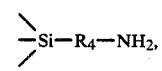 (8)

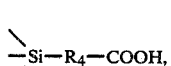 (9)

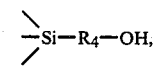 (10)

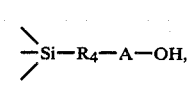 (11)

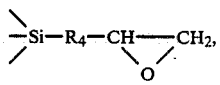 (12)

wherein
$R_1$ and $R_2$ are hydrogen, a $C_1$ to $C_4$ alkyl group, a cyclo hexyl group, a phenyl group or a benzyl group, with the proviso that $R_1$ and $R_2$ are not simultaneously either hydrogen or a methyl group;
$R_3$ is a $C_1$ to $C_4$ alkyl group;
$R_4$ is a $C_1$ to $C_6$ alkylene group; and
A is a polyalkylene having a degree of polymerization of 1 to 50.

* * * * *

UNITED STATES PATENT AND TRADEMARK OFFICE
CERTIFICATE OF CORRECTION

PATENT NO. : 4,761,445

DATED : August 2, 1988

INVENTOR(S) : Chiba

It is certified that error appears in the above-identified patent and that said Letters Patent is hereby corrected as shown below:

Column 2, line 18, correct the spelling of "metaxylylenediamine" and "paraxylylenediamine";

lines 25-26, correct the spelling of "2-chloroterephtalic".

Column 3, line 64, change "fo" to --of--.

Column 10, claim 8, line 39, correct the spelling of "cyclohexyl".

Signed and Sealed this

Thirteenth Day of February, 1990

Attest:

JEFFREY M. SAMUELS

Attesting Officer    Acting Commissioner of Patents and Trademarks